United States Patent
Janke et al.

(10) Patent No.: US 12,488,110 B2
(45) Date of Patent: Dec. 2, 2025

(54) PORTABLE CHIP DEVICE AND METHOD FOR EXECUTING A SOFTWARE MODULE UPDATE IN A PORTABLE CHIP DEVICE

(71) Applicant: Infineon Technologies AG, Neubiberg (DE)

(72) Inventors: Marcus Janke, Munich (DE); Manfred Roth, Munich (DE); Stephan Miculcy, Munich (DE)

(73) Assignee: Infineon Technologies AG, Neubiberg (DE)

( * ) Notice: Subject to any disclaimer, the term of this patent is extended or adjusted under 35 U.S.C. 154(b) by 540 days.

(21) Appl. No.: 17/958,859

(22) Filed: Oct. 3, 2022

(65) Prior Publication Data

US 2023/0114775 A1  Apr. 13, 2023

(30) Foreign Application Priority Data

Oct. 13, 2021  (DE) .......................... 102021126509.6

(51) Int. Cl.
*G06F 21/57* (2013.01)
*G06F 8/65* (2018.01)
(Continued)

(52) U.S. Cl.
CPC .............. *G06F 21/572* (2013.01); *G06F 8/65* (2013.01); *H04L 9/0852* (2013.01); *H04L 9/3234* (2013.01); *G06F 2221/033* (2013.01)

(58) Field of Classification Search
CPC ........ G06F 13/105; G06F 13/16; G06F 13/36; G06F 13/4068; G06F 15/7867;
(Continued)

(56) References Cited

U.S. PATENT DOCUMENTS 6,356,869 B1 *  3/2002  Chapados ............... G10L 15/22
                                              704/E15.04
8,171,309 B1 *  5/2012  Poo ..................... G06F 11/3648
                                              713/192
(Continued)

FOREIGN PATENT DOCUMENTS

DE    102014220616 A1    4/2016

OTHER PUBLICATIONS

Schneier, Bruce , "Angewandte Kryptographie", Addison-Wesley Publishing Company, 1996, 1-19.

*Primary Examiner* — Sharif E Ullah
(74) *Attorney, Agent, or Firm* — Murphy, Bilak & Homiller, PLLC (57) ABSTRACT

A portable chip device comprises a chip having an operating system and a loader, the loader being configured to load a software module onto the chip and/or to render the software module in the chip executable, a communications interface configured to communicate with an external reader, the portable chip device being configured to carry out a software module update by: receiving a second key in the loader via communication between the external reader and the communications interface, where the communication is encrypted with a first key, and storing the second key in the loader, the operating system being configured to provide the decryption of the communication encrypted with the first key, authenticating the external reader using the symmetric key stored in the loader, receiving software module update data in the loader via the communications interface, and executing the software module update with the software module update data.

23 Claims, 5 Drawing Sheets

(51) Int. Cl.
*H04L 9/08* (2006.01)
*H04L 9/32* (2006.01)

(58) Field of Classification Search
CPC ............. G06F 21/75; G06F 2221/2125; G06F 9/30145; G06F 21/71; G06F 15/7807; G06F 21/572; G09C 1/00; H04L 2209/12; H04L 9/002; H04L 9/16
USPC ........ 713/189, 150, 163, 181; 726/2, 21, 36; 380/255, 264, 276
See application file for complete search history.

(56) References Cited

U.S. PATENT DOCUMENTS

| | | | | |
|---|---|---|---|---|
| 8,918,679 | B2* | 12/2014 | Janke | G06F 11/2215 714/25 |
| 9,178,514 | B1* | 11/2015 | Carlson | H03K 19/17768 |
| 10,162,985 | B1* | 12/2018 | Carlson | H04L 9/002 |
| 10,678,535 | B2* | 6/2020 | Gore | G06F 9/44589 |
| 10,725,853 | B2* | 7/2020 | Zhang | G06F 11/1666 |
| 10,726,162 | B2* | 7/2020 | Sastry | G06F 21/85 |
| 11,310,198 | B2* | 4/2022 | Couillard | G06F 21/606 |
| 2007/0162653 | A1* | 7/2007 | Janke | G07F 7/086 710/34 |
| 2007/0194421 | A1* | 8/2007 | Janke | H01L 23/552 257/679 |
| 2007/0200215 | A1* | 8/2007 | Janke | G06K 19/07381 257/679 |
| 2008/0016135 | A1* | 1/2008 | Janke | G06F 7/588 380/46 |
| 2008/0022398 | A1* | 1/2008 | Janke | G06K 19/073 726/20 |
| 2008/0164907 | A1* | 7/2008 | Mercaldi-Kim | H03K 19/177 326/41 |
| 2009/0219051 | A1* | 9/2009 | Zhang | H03K 19/17758 716/132 |
| 2011/0145547 | A1* | 6/2011 | Vorbach | G06F 9/30036 326/41 |
| 2013/0173970 | A1* | 7/2013 | Kleveland | G11C 29/50 714/710 |
| 2013/0297948 | A1* | 11/2013 | Lee | G06F 3/0619 713/193 |
| 2014/0108825 | A1* | 4/2014 | O'Loughlin | G06F 21/73 713/193 |
| 2014/0223569 | A1* | 8/2014 | Gail | G06F 21/60 726/26 |
| 2015/0019803 | A1* | 1/2015 | Miller | G06F 3/0611 711/125 |
| 2015/0082420 | A1* | 3/2015 | Love | G06F 21/71 726/16 |
| 2015/0278670 | A1* | 10/2015 | Laackmann | G06K 19/06206 235/492 |
| 2016/0011801 | A1* | 1/2016 | Goldberg | G06F 3/0655 711/114 |
| 2016/0378996 | A1* | 12/2016 | Smith | G06F 21/72 713/190 |
| 2017/0012952 | A1* | 1/2017 | Cocchi | H04L 63/062 |
| 2017/0090935 | A1* | 3/2017 | Falsafi | G06F 12/0862 |
| 2017/0115350 | A1* | 4/2017 | Zhang | G01R 31/3177 |
| 2017/0359897 | A1* | 12/2017 | Pueschner | G06K 19/07737 |
| 2019/0220419 | A1* | 7/2019 | Lin | G06Q 50/184 |
| 2019/0278886 | A1* | 9/2019 | Li | H04L 63/0428 |
| 2019/0392120 | A1* | 12/2019 | Lattin | H04W 12/35 |
| 2020/0004933 | A1* | 1/2020 | Cocchi | G06F 21/121 |
| 2023/0074708 | A1* | 3/2023 | Shen | H04L 9/0894 |
| 2023/0367912 | A1* | 11/2023 | Janke | G06F 21/64 |

* cited by examiner

PORTABLE CHIP DEVICE AND METHOD FOR EXECUTING A SOFTWARE MODULE UPDATE IN A PORTABLE CHIP DEVICE

TECHNICAL FIELD

The invention relates to a portable chip device and a method for executing a software module update in a portable chip device.

BACKGROUND

An increasingly essential property of portable chip devices, in particular chip devices providing (data) security-critical applications such as identification documents, is that of being able to also carry out an update of individual applications, or even of an entire operating system, after delivery to the customer, i.e., in the field.

Such an update in the field is defined in the protection profile "Security IC Platform Protection Profile with Augmentation Packages, (PP0084), package 2, phase 7, developed as part of The Common Criteria for Information Technology Security Evaluation (CC) standards.

Figure 1:
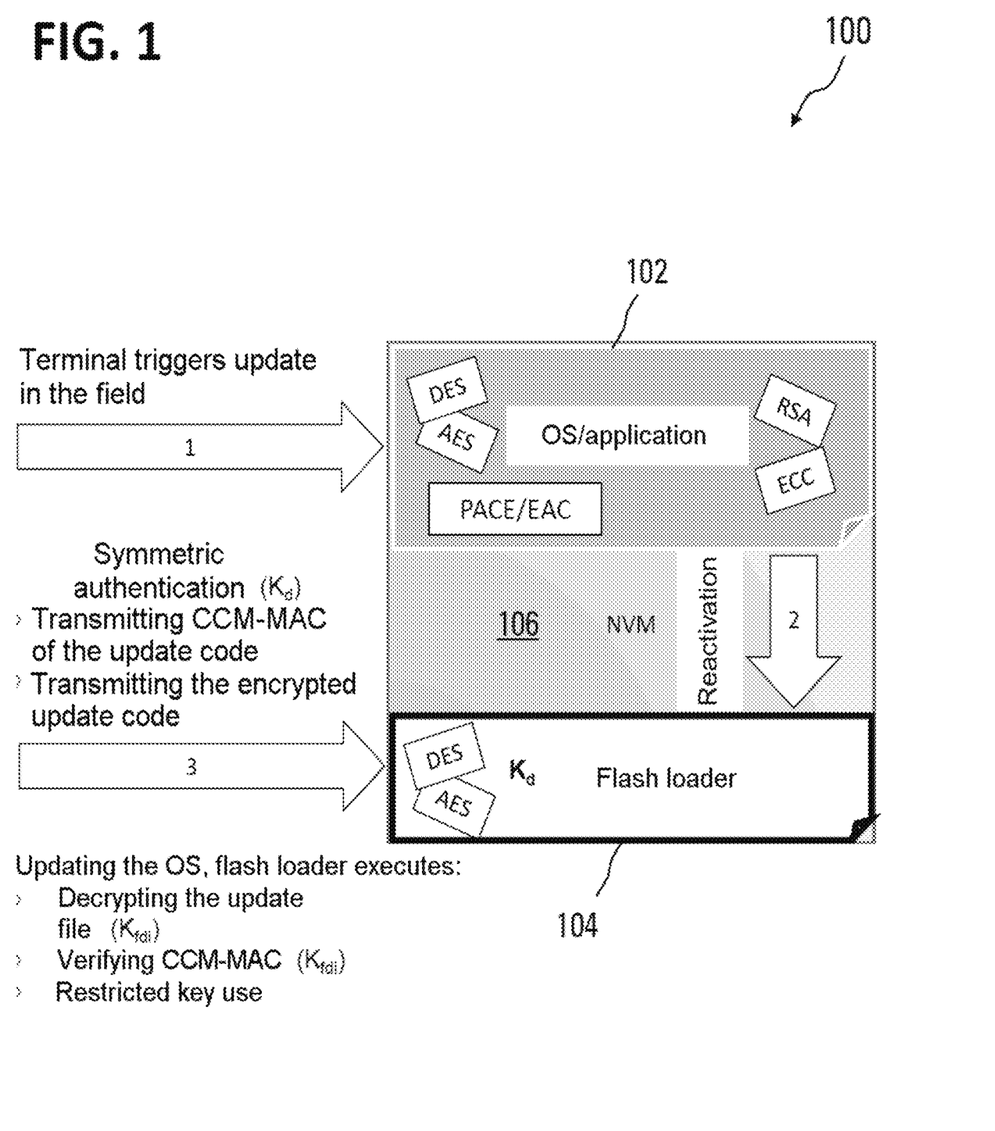
FIG. 1 shows an illustration of an update procedure for a portable chip device according to the prior art.

FIG. 1 illustrates how an exemplary security update is carried out in the field according to the prior art. As explained below, this uses a flash loader 104 and a symmetric encryption method.

In the case of a portable chip device 100, an update in the field can be triggered by means of an external reader, for example a terminal (FIG. 1, process 1). By way of example, the update may be a complete replacement of the operating system or a partial update relating to a repair of errors, an update of firmware and/or libraries (for example, of those relating to encryption/decryption functions) and/or an expansion of functions of the original operating system or of individual applications.

The use of what is known as a flash loader 104 (a type of boot loader which may be arranged in a nonvolatile memory (NVM) 106 of the portable chip device 100) may become necessary, especially when replacing the entire operating system (e.g., in the form of an image). The (e.g., certified) flash loader 104 may also be used when updating individual applications.

Currently, the update procedure is typically such that only a key requiring little memory, currently a symmetric key $K_d$, is stored in the flash loader 104, because of the small amount of memory available.

Accordingly, the flash loader 104 can only support a symmetric authentication algorithm, for example a mutual authentication, which is based on the authenticated "advanced encryption standard counter mode" (AES-CCM) encryption method, which is in turn based on a block cipher and which uses the symmetric key $K_d$.

Following a reactivation of the flash loader 104 (at 2 in FIG. 1), there initially is the symmetric authentication, a transfer of a CCM-MAC (counter with CBC-MAC, message authentication code (MAC)) for the update data in order to be able to verify the integrity thereof, and then a transfer of the encrypted update data, which may be encrypted by means of the authentication key $K_d$ or, for example, as depicted in FIG. 1, by means of an additional key $K_{fdi}$ which may likewise be stored in the flash loader 104.

The flash loader 104 decrypts the update data, for example using the key $K_{fdi}$, verifies the data integrity by means of CCM-MAC, and executes the update.

In a flash loader 104 according to the prior art, authorization data are only stored during the chip production and not during the use in the field. Accordingly, the symmetric (secret) key is typically stored in the flash loader over the entire service life of the chip device and the key is typically the same for all chips in a project (e.g., identification card chips), which represents a security problem.

Restricting the possibility of accessing the flash loader can only be rendered possible by providing the key ($K_d$, optionally also $K_{fdi}$) with an access restriction, for example with a time limit, a limit to a number of possible uses, or the like.

SUMMARY

It would be easier to update a large number of portable chip devices 100 if use could be made of a digital signature that is based on a public key as a trust anchor and group keys, to verify an authentication for the execution of precisely this update (e.g., that the connected terminal is authorized to initiate/prompt the execution of the update).

For a software module update (update for short) in the case of a portable chip device already in the field, an operating system which is installed on said chip device and configured for communication encrypted with a first key is used in various exemplary embodiments to receive a message prompting an update, authenticate the transmitter (e.g., a terminal) of the update prompt and verify the authorization of the latter to trigger the update. The communication encrypted by means of the first key is further used to store a second key for executing the update in a loader. The update itself can subsequently be executed by means of an authentication using the second key.

The first key, which is used in the already installed operating system, may have greater demands in terms of chip area, for example require more storage space and/or additional processors, than the second key.

In an exemplary embodiment, the first key may be an asymmetric key and the second key may be a symmetric key.

In a further exemplary embodiment, the first key may be configured for post-quantum cryptography, for example as a very long symmetric key, and the second key may then be, for example, an asymmetric key with comparatively low spatial requirements or a shorter symmetric key.

Even if it might be the operating system itself that requires an update, the operating system requiring an overhaul should nevertheless be able to carry out the authentication and verification of the authorization by means of the first key and receive the second key and store the latter in the loader, for example a flash loader.

Exemplary embodiments of the invention are illustrated in the figures and are explained in more detail below.

DETAILED DESCRIPTION

In the following detailed description, reference is made to the accompanying drawings which form part of said description and show, for illustration, specific embodiments in which the invention can be performed. Other embodiments can be used and structural or logical changes can be made without departing from the scope of protection of the present invention. The features of the various exemplary embodiments described herein can be combined with one another, unless specifically stated otherwise. The following detailed description therefore should not be interpreted in a restrictive sense, and the scope of protection of the present invention is defined by the attached claims.

Within the scope of this description, the terms "linked," "connected," and "coupled" are used to describe both a direct and an indirect link, a direct or indirect connection, and direct or indirect coupling. In the figures, identical or similar elements are provided with identical reference signs if expedient.

Figure 2:
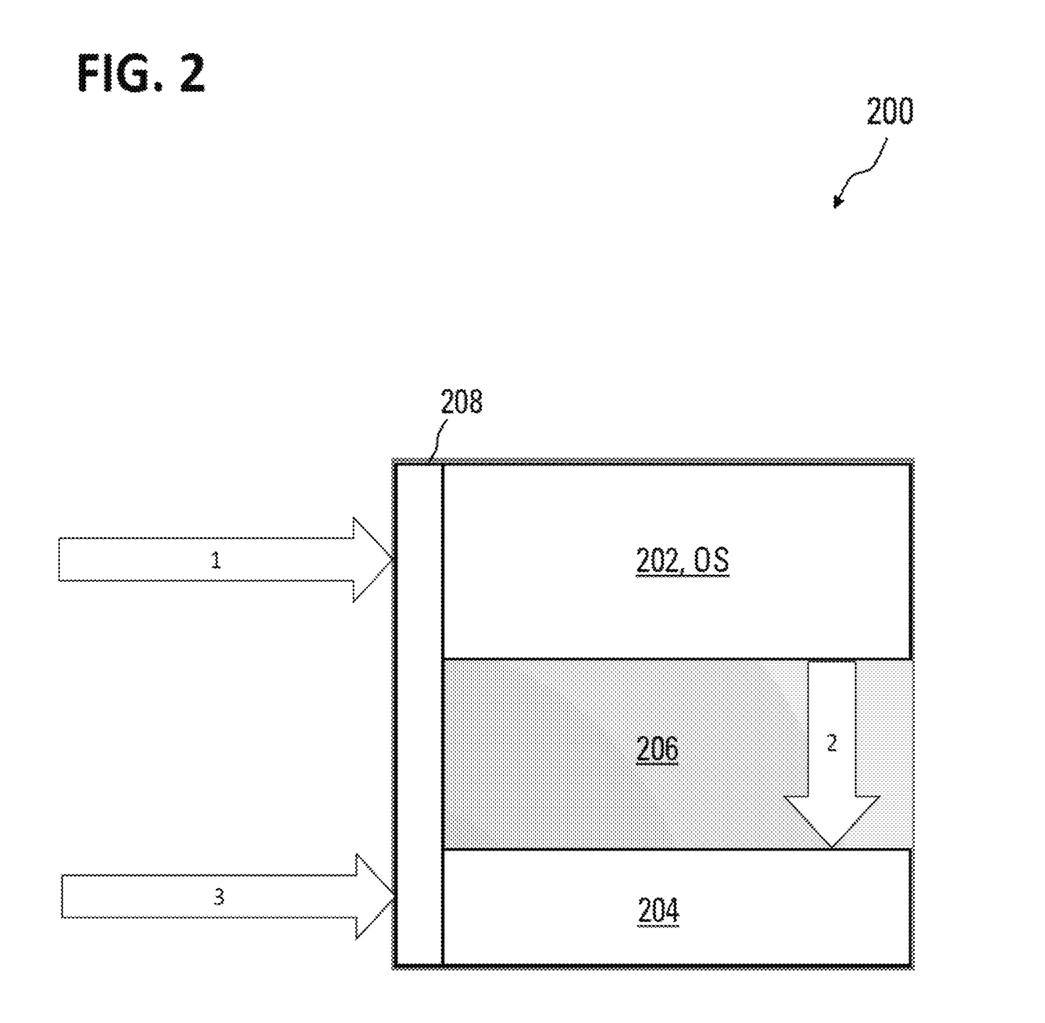
FIGS. 2, 3 and 4 each show an illustration of an update procedure for a portable chip device according to various exemplary embodiments.
Figure 3:
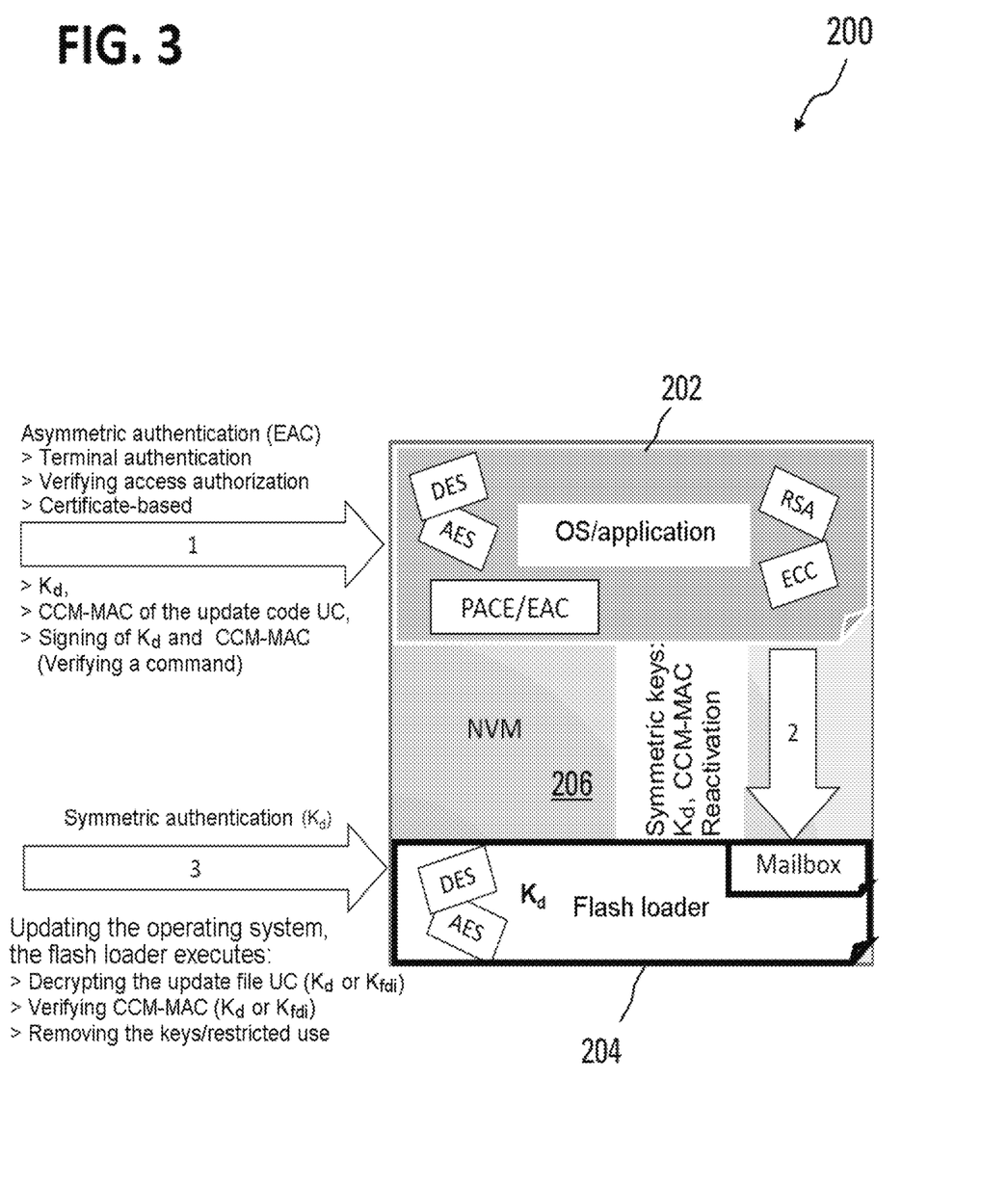
Figure 4:
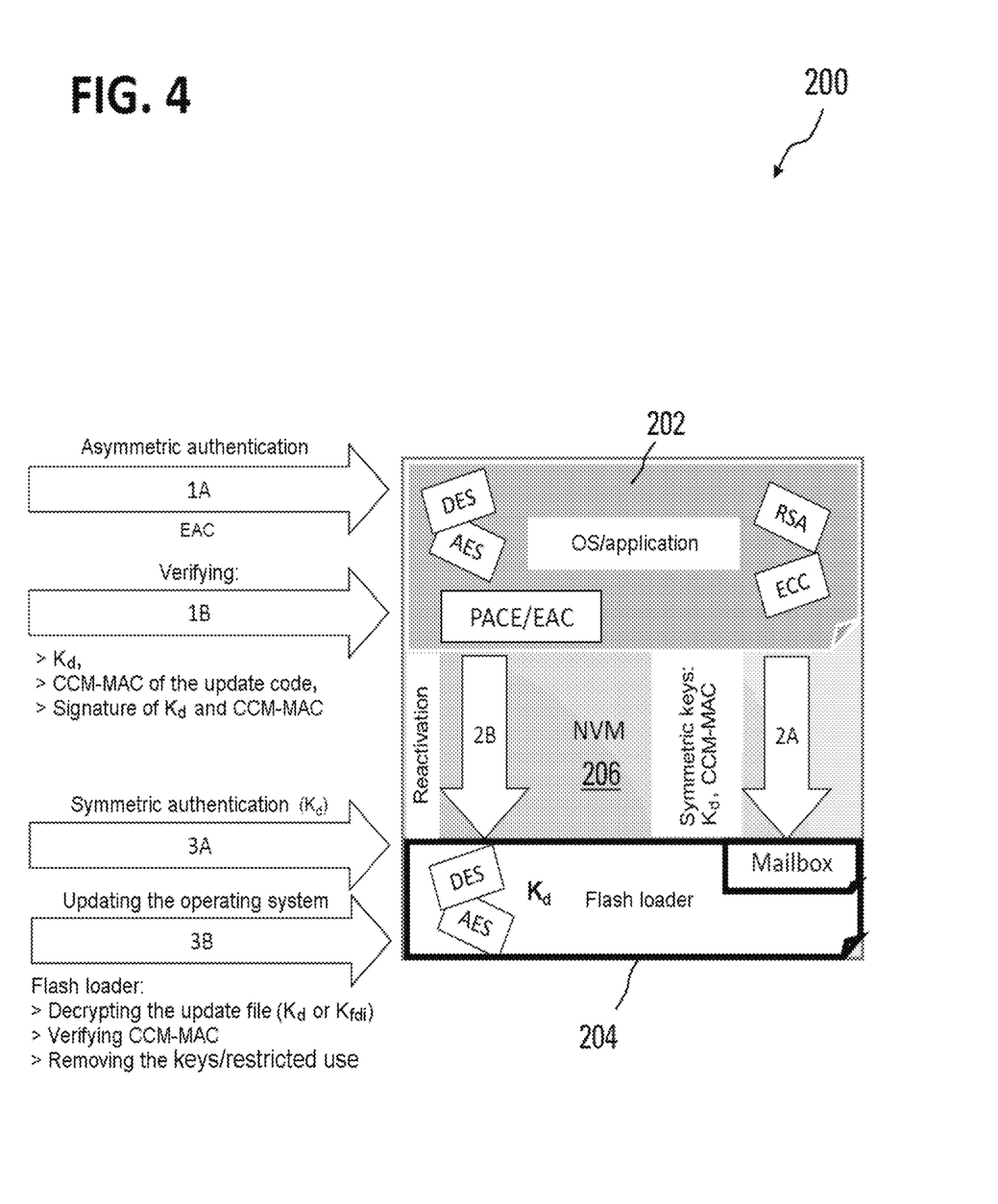

FIG. 2, FIG. 3, and FIG. 4 each show an illustration of an update procedure in the field for a portable chip device 200 according to various exemplary embodiments.

The chip device 200 comprises a chip that has an operating system OS and a loader 204, for example what is known as a flash loader or boot loader.

The operating system OS may be part of a software segment 202, which may optionally include additional software modules (modules for short, also referred to as software applications or applications).

The loader 204 can be configured to load a software module onto the chip, for example into the software segment 202, and/or render executable the software module in the chip.

The operating system OS, the additional software modules, and the loader 204 can be formed in a non-volatile memory (NVM) 106 or be based on the data stored there.

The chip device 200 further comprises a communications interface 208, which is configured to communicate with an external reader. The external reader itself is not depicted, but the data interchange processes are illustrated on the basis of the numbered arrows (1 and 3 in FIG. 2 and FIGS. 3; 1A, 1B, 3A and 3B in FIG. 4), with the communication typically being set up as two-way communication.

Even though the communications interface 208 has been illustrated as an element separate from the operating system OS and the loader 204 in FIG. 2, it is to be understood that the communications interface 208 may include both hardware components, such as contact faces for a contact-based communication and/or an antenna for a contactless communication and a control circuit, and software components as part of the operating system OS, of an application and/or of the loader 204, with, in particular, it having been ensured that the loader 204 is capable of communication by means of the communications interface 208 even after a deactivation of the operating system OS.

In various exemplary embodiments, the software module update is implemented by means of the following processes:

receiving a second (e.g., symmetric) key $K_d$ in the loader 204 (labeled 2 in FIG. 2 and FIG. 3; 2A in FIG. 4) by means of a communication between the external reader and the communications interface (1 in FIGS. 2 and 3; 1A and 1B in FIG. 4), the communication having been (e.g., asymmetrically) encrypted with a first key, and storing the second key $K_d$ in the loader 204 (also 2 or 2A), the operating system OS being configured to provide the decryption of the communication encrypted with the first key, illustrated in FIGS. 3 and 4 by the acronyms PACE, EAC and, in particular, RSA (extended access control (EAC), password authenticated connection establishment (PACE), RSA (Rivest-Shamir-Adleman), an asymmetric cryptographic method) introduced in the software segment 202, which also houses the operating system OS. Optionally, the operating system OS may also use an alternative encryption, for example elliptic curve cryptography (ECC) or post-quantum cryptography (PQC). Both the loader 204 and the operating system OS are configured for communication encrypted with the second key, illustrated on the basis of the introduced acronyms DES and AES (data encryption standard, advanced encryption standard). Here, these specific protocols and decryption methods should be understood to be exemplary;

authenticating the external reader by means of the second key $K_d$ stored in the loader 204 (process 3 in FIGS. 2 and 3; 3B in FIG. 4);

receiving software module update data UC (also referred to as update code) in the loader 204 by means of the communications interface 208 (process 3 in FIGS. 2 and 3; 3B in FIG. 4); and executing the software module update by means of the loader 204 upon successful authentication of the external reader (process 3 in FIGS. 2 and 3; 3A and 3B in FIG. 4).

The processes are typically carried out in a sequence according to the numbering in processes in the figures, especially to the extent of the communication using the operating system OS occurring first, said communication having been encrypted with the first key, followed by the transfer of the second key from the operating system OS to the loader 204 and thereupon followed by the communication encrypted with the second key, within the scope of which the update data UC that are verified and installed are transmitted.

In various exemplary embodiments, the operating system OS (and optionally additional applications) are used in the field in order to carry out, (e.g., asymmetrically) encrypted with the first key, a complete authentication and verification of an authorization of the external reader (e.g., terminal). The communication encrypted with the first key can further be used to authenticate the portable chip device 200 vis-à-vis the external reader as authorized to receive the update.

Subsequently, data which are used for a secure execution of the update are transferred from the external reader to the operating system OS of the portable chip device 200 (said data still being encrypted with the first key), examples of said data being at least one second and optionally a third (e.g., symmetric) key ($K_d$, optionally $K_{fdi}$), checksums (e.g., CCM-MAC of the update data UC), etc.

On the basis of the signature, the operating system OS verifies that the data are correct.

Provided the data have been verified as correct, the operating system OS transmits the data (e.g., $K_d$, optionally $K_{fdi}$, CCM-MAC of the update data UC, etc.) to the loader 204 which has been equipped for this purpose with a function illustratively described in FIGS. 3 and 4 as a "mailbox". The new "mailbox" functionality essentially means that the loader 204 has a (previously free) memory region configured to receive and store data from the operating system OS or an application configured to this end, and hence differs from loaders 104 according to the prior art which either have unchangeable data pre-stored during the chip production or else are at best configured such that individual parameters in the loader 104 might be preset as changeable, for example address ranges or the like.

Subsequently, the operating system OS activates the loader 204. If the operating system OS itself is the target of the update, the operating system OS can subsequently be shut down. If only individual software modules are the target of the update, the operating system OS may be able to continue to run during the update.

The external reader authenticates itself vis-à-vis the loader 204 using the second key $K_d$ previously transmitted encrypted with the first key (and optionally using additional transmitted and/or permanently stored data/parameters) and executes the update by means of the loader 204.

By means of the "mailbox function", that is to say the chip device-internal transfer of the secret data (in particular $K_d$) required for the authentication and decryption in the update procedure from the operating system OS to the loader 204, it is possible to dispense with permanent storage of the secret data (in particular $K_d$) in the loader 204 and hence increase a data security of the portable chip device 200.

A similarly high security for an update in the field could be provided by virtue of the loader 204 also being enabled for communication that is encrypted with the first key. However (as an example for the first key being an asymmetric key), this would mean that additional cryptographic libraries would have to be available for use in the loader 204, which libraries would have to be standardized or adjusted for the respective user and would in any case mean a significantly increased need for chip area, which would therefore be accompanied by correspondingly increased costs.

In an exemplary embodiment, a software module update in a portable chip device 200 can be executed as follows:

By means of an (e.g., asymmetric) authentication with the first key (e.g., EAC), an external reader (e.g., a terminal) can authenticate itself vis-à-vis the portable chip device 200, for example vis-à-vis the operating system OS or a (security) application.

By way of example, the authentication can be implemented in a certificate-based fashion, for example as what is known as a "terminal authentication" (TA), which may for example also contain access rights for an operating system update.

After successful authentication, the external reader transmits a second (e.g., symmetric) key $K_d$, which, for example, is usable for an authentication.

During the same transmission procedure or in a subsequent transmission procedure, the external reader can additionally transmit update-specific data encrypted with the first key to the operating system (or the application), for example a MAC sum of a log file (e.g., LDF file) for the update to be executed (the CCM-MAC of the LDF, for example, can be reused in this case), update parameters such as the address range in the memory, for example the NVM, a version number of the update, etc. These data can be signed for the transmission.

The operating system (or the application) can verify the signature (e.g., by means of a "VERIFY" ISO command).

In the case of a successfully verified signature, the operating system or the application can verify whether the version number is admissible for an update.

Once this has been successfully verified, the operating system or the (security) application is able to store the received data (e.g., the second key $K_d$, optionally an additional third (e.g., symmetric) key $K_{fdi}$, CCM-MAC and NVM range for the expected download) in the loader 204. In the process, the above-described mailbox function of the loader 204 can be utilized.

If the number of uses of the second key is intended to be restricted, a key use counter can be initialized.

Subsequently, the operating system can activate the loader 204 and can trigger a reset of the chip device 200. The loader 204 becomes active after the next boot of the chip device 200.

Following the boot, the external reader once again authenticates itself vis-à-vis the chip device 200, the authentication vis-à-vis the loader 204 this time, however, being implemented using the previously transmitted symmetric key $K_d$.

The external reader can subsequently transmit commands of the LDF file for the download image encrypted with the second key to the loader 204. Rather than providing a complete software module update in the form of a complete download image, it is also possible to provide merely parts of software modules for the update.

By way of example, the second (e.g., symmetric) key $K_{fdi}$ can be used for the encryption/decryption of the LDF file and/or the download image, said second key likewise having been transmitted previously by means of the (e.g., asymmetric) communication encrypted with the first key. Alternatively, $K_{fdi}$ may have been pre-stored in the loader 204, for example during the production of the chip. Alternatively, the second key $K_d$ can be used instead of $K_{fdi}$ for the encryption/decryption of the update data (and optionally the log data, update parameters, etc.).

The loader decrypts the download image using $K_{fdi}$ (or $K_d$), verifies the NVM address range, and writes the image to the address range (this is implemented directly, i.e., without buffer storing in the loader 204, due to lack of memory in the loader 204).

Finally, the loader 204 verifies the integrity by virtue of forming CCM-MAC and comparing the latter to the previously transmitted value stored in the loader 204.

In the case of a confirmed integrity of the update data, the second key $K_d$ (and optionally additionally the third key $K_{fdi}$) is deleted from the loader 204 and there is a reset to the (optionally updated) operating system OS, meaning that the operating system OS (and no longer the loader 204) is active, in particular following a restart.

In the case of an unconfirmed integrity, the update is declared invalid and the overwritten range of the (NVM) memory 106 is deleted. The chip device 200 remains in the loader mode of operation, that is to say the loader 204 still is active following a restart.

The update procedure can be repeated until the optionally installed counter has reached a predetermined target value or limit value. A renewed update attempt is no longer possible thereafter. By way of example, such a functionality can be configured to avoid misuse.

Should an update procedure be interrupted, for example on part of the external reader, the external reader may be configured to identify the chip device 200, for example on the basis of a unique chip identification number.

Figure 5:
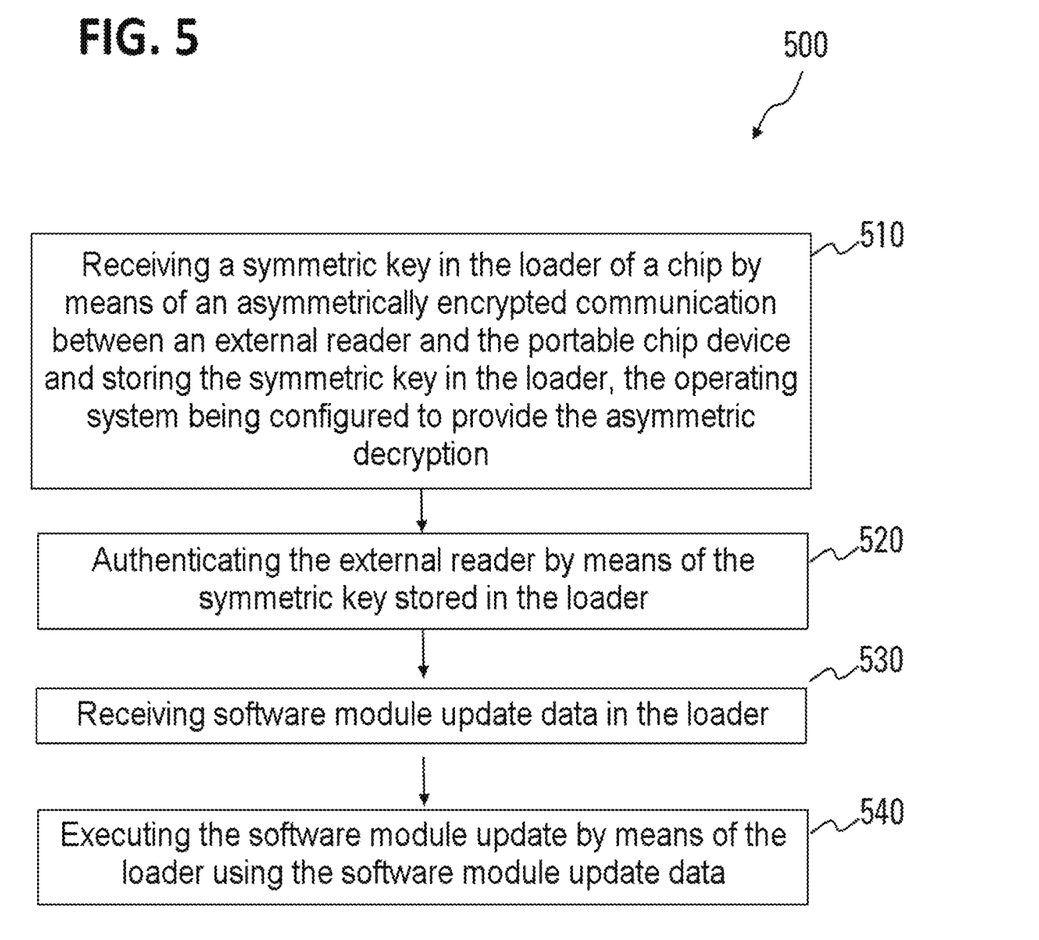
FIG. 5 shows a flow chart of a method for executing a software module update in a portable chip device according to various exemplary embodiments.

FIG. 5 shows a flow chart 500 of a method for executing a software module update in a portable chip device according to various exemplary embodiments.

The chip device comprises a chip having an operating system and a loader.

The method includes receiving a second key in the loader by means of a communication between an external reader and the portable chip device, the communication having been encrypted with a first key, and storing the second key in the loader, the operating system being configured to provide the decryption of the communication encrypted with the first key (510), authenticating the external reader by means of the second key stored in the loader (520), receiving software module update data in the loader (530), and executing the software module update by means of the loader upon successful authentication of the software module update data (540).

Some exemplary embodiments are stated in summary below.

Exemplary embodiment 1 is a portable chip device comprising a chip having an operating system and a loader, the loader being configured to load a software module onto the chip and/or to render the software module in the chip executable, a communications interface configured to communicate with an external reader, the portable chip device being configured to carry out a software module update by means of the following processes: receiving a second key in the loader by means of a communication between the external reader and the communications interface, the communication having been encrypted with a first key, and storing the second key in the loader, the operating system being configured to provide the decryption of the communication encrypted with the first key, authenticating the external reader by means of the symmetric key stored in the loader, receiving software module update data in the loader by means of the communications interface and executing the software module update by means of the loader using the software module update data.

Exemplary embodiment 2 is a portable chip device according to exemplary embodiment 1, wherein the communication by means of the first key has a greater demand for chip area on the portable chip device than the communication by means of the second key.

Exemplary embodiment 3 is a portable chip device according to exemplary embodiment 1 or 2, wherein the first key is an asymmetric key and the second key is a symmetric key.

Exemplary embodiment 4 is a portable chip device according to exemplary embodiment 1 or 2, wherein the first key is configured for post-quantum cryptography.

Exemplary embodiment 5 is a portable chip device according to any one of exemplary embodiments 1 to 4, wherein the software module update is or includes an update of the operating system.

Exemplary embodiment 6 is a portable chip device according to any one of exemplary embodiments 1 to 5, wherein the loader is formed as a boot loader.

Exemplary embodiment 7 is a portable chip device according to any one of exemplary embodiments 1 to 6, wherein the software module update data include a partial or complete software module.

Exemplary embodiment 8 is a portable chip device according to any one of exemplary embodiments 1 to 7, wherein the software module update data are encrypted and the loader is configured to decrypt the software module update data before the software module update is executed.

Exemplary embodiment 9 is a portable chip device according to exemplary embodiment 8, wherein a third key for decrypting the software module update data differs from the second key and is stored in the loader prior to an execution of the software module update.

Exemplary embodiment 10 is a portable chip device according to exemplary embodiment 8, wherein a third key for decrypting the software module update data differs from the second key and the portable chip device is configured to provide the third key for decrypting the software module update data for the loader together with the second key and/or configured to provide the third key for decrypting the software module update data in the loader by means of an additional communication between the external reader and the communications interface, said additional communication having been encrypted with the first key.

Exemplary embodiment 11 is a portable chip device according to exemplary embodiment 8, wherein the key for decrypting the software module update data is the second key.

Exemplary embodiment 12 is a portable chip device according to any one of exemplary embodiments 1 to 11, which is further configured to delete the second key from the loader after the software module update has been executed.

Exemplary embodiment 13 is a portable chip device according to exemplary embodiment 10, which is further configured to delete the third key from the loader after the software module update has been executed.

Exemplary embodiment 14 is a portable chip device according to any one of exemplary embodiments 1 to 12, wherein the loader comprises a nonvolatile memory in which the second key is stored.

Exemplary embodiment 15 is a portable chip device according to exemplary embodiment 10 or 13, wherein the loader comprises a nonvolatile memory in which the third key is stored.

Exemplary embodiment 16 is a portable chip device according to any one of exemplary embodiments 1 to 15, which is further configured to use the communication encrypted with the first key to determine whether the external reader is authorized to initiate a software module update.

Exemplary embodiment 17 is a portable chip device according to any one of exemplary embodiments 1 to 16, which is further configured to identify itself as authorized to receive a software module update vis-à-vis the external reader by means of the communication encrypted with the first key.

Exemplary embodiment 18 is a portable chip device according to any one of exemplary embodiments 1 to 17, wherein the communications interface is configured for contact-based communication and/or configured for contactless communication.

Exemplary embodiment 19 is a portable chip device according to any one of exemplary embodiments 1 to 18 which further comprises a counter, wherein the portable chip device is configured to change a count value of the counter in the direction of a target value in the case of an unsuccessful and/or successful software module update and to refuse the execution of the software module update should the count value have reached or exceeded the target value.

Exemplary embodiment 20 is a method for executing a software module update in a portable chip device comprising a chip having an operating system and a loader, the method including: receiving a second key in the loader by means of a communication between an external reader and the portable chip device, the communication having been encrypted with a first key, and storing the second key in the loader, the operating system being configured to provide the decryption of the communication encrypted with the first key, authenticating the external reader by means of the second key stored in the loader, receiving software module update data in the loader and executing the software module update by means of the loader using the software module update data.

Exemplary embodiment 21 is a method according to exemplary embodiment 20, wherein the communication by means of the first key has a greater demand for chip area on the portable chip device than the communication by means of the second key.

Exemplary embodiment 22 is a portable chip device according to exemplary embodiment 20 or 21, wherein the first key is an asymmetric key and the second key is a symmetric key.

Exemplary embodiment 23 is a portable chip device according to exemplary embodiment 20 or 21, wherein the first key is configured for post-quantum cryptography.

Exemplary embodiment 24 is a method according to any one of exemplary embodiments 20 to 23, wherein the software module update is or includes an update of the operating system.

Exemplary embodiment 25 is a method according to any one of exemplary embodiments 20 to 24, wherein the loader is formed as a boot loader.

Exemplary embodiment 26 is a method according to any one of exemplary embodiments 20 to 25, wherein the software module update data include a partial or complete software module.

Exemplary embodiment 27 is a method according to any one of exemplary embodiments 20 to 26, wherein the software module update data are encrypted and the method further includes decrypting the software module update data before the software module update is executed.

Exemplary embodiment 28 is a method according to exemplary embodiment 27, wherein a third key for decrypting the software module update data differs from the second key and is stored in the loader prior to an execution of the software module update.

Exemplary embodiment 29 is a method according to exemplary embodiment 27, wherein a third key for decrypting the software module update data differs from the second key and the third key for decrypting the software module update data is provided for the loader together with the second key and/or provided by means of an additional communication between the external reader and the portable chip device, said additional communication having been encrypted with the first key.

Exemplary embodiment 30 is a method according to exemplary embodiment 27, wherein the key for decrypting the software module update data is the second key.

Exemplary embodiment 31 is a method according to any one of exemplary embodiments 20 to 30, which further includes deleting the second key from the loader after the software module update has been executed.

Exemplary embodiment 32 is a method according to either of exemplary embodiments 28 and 29, which further includes deleting the third key from the loader after the software module update has been executed.

Exemplary embodiment 33 is a method according to any one of exemplary embodiments 20 to 32, wherein the loader comprises a nonvolatile memory in which the second key is stored.

Exemplary embodiment 34 is a method according to any one of exemplary embodiments 28, 29 and 31, wherein the loader comprises a nonvolatile memory in which the third key is stored.

Exemplary embodiment 35 is a method according to any one of exemplary embodiments 20 to 34, which further includes using the communication encrypted with the first key to determine whether the external reader is authorized to initiate a software module update.

Exemplary embodiment 36 is a method according to any one of exemplary embodiments 20 to 35, which further includes identifying itself as authorized to receive a software module update vis-à-vis the external reader by means of the communication encrypted with the first key.

Exemplary embodiment 37 is a method according to any one of exemplary embodiments 20 to 36, wherein the communication includes contact-based communication and/or contactless communication.

Exemplary embodiment 38 is a method according to any one of exemplary embodiments 20 to 37, which further includes changing a count value in the direction of a target value in the case of an unsuccessful and/or successful software module update, and refusing the software module update should the count value have reached or exceeded the target value.

Further advantageous configurations of the device emerge from the description of the method and vice versa.

What is claimed is:

1. A portable chip device, comprising:
   a chip having memory and an operating system and software loader functionality installed in the memory, the software loader functionality being configured to load a software module onto the chip and/or to render the software module in the chip executable;
   a communications interface configured to communicate with an external reader device;
   the portable chip device being configured to carry out a software module update by:
   receiving a second key with the software loader functionality via communication between the external reader device and the communications interface, wherein the communication is encrypted with a first key, and storing the second key in the chip, the operating system being configured to provide the decryption of the communication encrypted with the first key;
   authenticating the external reader device using the stored second key;
   receiving software module update data with the software loader functionality via the communications interface;
   executing the software module update with the software module update data, using the software loader functionality.

2. The portable chip device of claim 1, wherein the first key is an asymmetric key and the second key is a symmetric key.

3. The portable chip device of claim 1, wherein the first key is configured for post-quantum cryptography.

4. The portable chip device of claim 1, wherein the software module update is or includes an update of the operating system.

5. The portable chip device of claim 1, wherein the software module update data are encrypted and the software loader functionality is configured to decrypt the software module update data before the software module update is executed.

6. The portable chip device of claim 5, wherein a third key for decrypting the software module update data differs from the second key and is stored in the chip prior to an execution of the software module update.

7. The portable chip device of claim 5, further configured to provide the third key for the software loader functionality together with the second key and/or configured to provide the third key for use by the software loader functionality via additional communication between the external reader device and the communications interface, wherein said additional communication is encrypted using the first key.

8. The portable chip device of claim 5, configured to decrypt the software module update data using the second key.

9. The portable chip device of claim 1, further configured to delete the second key from storage after the software module update has been executed.

10. The portable chip device of claim 1, wherein the software loader functionality comprises a nonvolatile memory in which the second key is stored.

11. The portable chip device of claim 1, further configured to determine whether the external reader device is authorized to initiate a software module update, the determination being implemented on the basis of the communication encrypted with the first key.

12. The portable chip device of claim 1, further configured to identify itself as authorized to receive a software module update vis-à-vis the external reader device via the communication encrypted with the first key.

13. The portable chip device of claim 1, further comprising a counter, wherein the portable chip device is configured to change a count value of the counter in the direction of a target value in the case of an unsuccessful and/or successful software module update and to refuse the execution of the software module update should the count value have reached or exceeded the target value.

14. A method for executing a software module update in a portable chip device comprising a chip having memory and an operating system and software loader functionality installed in the memory, the method including:
receiving a second key with the software loader functionality via communication between an external reader device and the portable chip device, wherein the communication is encrypted with a first key, and storing the second key in the memory, the operating system being configured to provide the decryption of the communication encrypted with the first key;
authenticating the external reader using the stored second key;
receiving software module update data with the software loader functionality;
executing the software module update with the software module update data, using the software loader functionality.

15. The method of claim 14, wherein the software module update is or includes an update of the operating system.

16. The method of claim 14, wherein the software module update data are encrypted, the method further including:
decrypting the software module update data before executing the software module update.

17. The method of claim 16, wherein a third key for decrypting the software module update data differs from the second key and is stored prior to an execution of the software module update.

18. The method of claim 16, wherein a third key for decrypting the software module update data differs from the second key and is provided for the software loader functionality together with the second key and/or provided via additional communication between the external reader device and the portable chip device, wherein said additional communication is encrypted with the first key.

19. The method of claim 16, wherein the software module update data are decrypted by using the second key.

20. The method of claim 14, further including:
deleting the second key from storage after the software module update has been executed.

21. The method of claim 14, further including:
determining whether the external reader device is authorized to initiate a software module update, the determination being implemented on the basis of the communication encrypted with the first key.

22. The method of claim 14, further including:
the portable chip device providing identification to the effect of being authorized to receive a software module update vis-à-vis the external reader device via the communication encrypted with the first key.

23. The method of claim 14, further including:
changing a count value in the direction of a target value in the case of an unsuccessful and/or successful software module update, and refusing the software module update should the count value have reached or exceeded the target value.

* * * * *